US008134762B2

(12) United States Patent
Ferman et al.

(10) Patent No.: US 8,134,762 B2
(45) Date of Patent: Mar. 13, 2012

(54) METHODS AND SYSTEMS FOR CHARACTERIZING REGIONS OF SUBSTANTIALLY-UNIFORM COLOR IN A DIGITAL IMAGE

(75) Inventors: Ahmet Mufit Ferman, Vancouver, WA (US); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1009 days.

(21) Appl. No.: 11/668,241

(22) Filed: Jan. 29, 2007

(65) Prior Publication Data

US 2008/0181497 A1    Jul. 31, 2008

(51) Int. Cl.
*H04N 1/46* (2006.01)
*H04N 1/387* (2006.01)
*G03F 3/08* (2006.01)
*G06K 9/34* (2006.01)
*G06K 9/00* (2006.01)
*G06K 9/38* (2006.01)

(52) U.S. Cl. ........ 358/522; 358/500; 358/515; 358/538; 358/453; 382/164; 382/168; 382/171; 382/172

(58) Field of Classification Search .............. 355/522; 382/164, 168, 171, 172, 190; 358/522
See application file for complete search history.

(56) References Cited

U.S. PATENT DOCUMENTS

| | | | |
|---|---|---|---|
| 5,454,050 A * | 9/1995 | Nakabayashi et al. | 382/165 |
| 5,768,412 A * | 6/1998 | Mitsuyama et al. | 382/173 |
| 5,848,183 A | 12/1998 | Farrell | |
| 6,043,900 A | 3/2000 | Feng et al. | |
| 6,064,762 A | 5/2000 | Haenel | |
| 6,198,845 B1 * | 3/2001 | Tse et al. | 382/169 |
| 6,222,642 B1 | 4/2001 | Farrell et al. | |
| 6,621,595 B1 * | 9/2003 | Fan et al. | 358/3.26 |
| 6,674,899 B2 | 1/2004 | Nagarajan et al. | |
| 6,807,301 B1 * | 10/2004 | Tanaka | 382/169 |
| 6,873,743 B2 * | 3/2005 | Steinberg | 382/275 |
| 2004/0037460 A1 * | 2/2004 | Luo et al. | 382/165 |
| 2005/0280849 A1 | 12/2005 | Kojima et al. | |

FOREIGN PATENT DOCUMENTS

| | | |
|---|---|---|
| EP | 1494454 A2 | 1/2005 |
| JP | 09-006971 A | 1/1997 |
| JP | 2005-260657 A | 9/2005 |

OTHER PUBLICATIONS

Japanese Patent Application No. 2008-012035—Office action—Mailing date Aug. 18, 2009.

* cited by examiner

*Primary Examiner* — King Poon
*Assistant Examiner* — Vincent Peren
(74) *Attorney, Agent, or Firm* — Kristine Elizabeth Matthews; David C. Ripma

(57) ABSTRACT

Aspects of the present invention relate to systems and methods for characterization of background regions of substantially-uniform color in a digital image. According to a first aspect of the present invention, a histogram of the first-channel values of a plurality of image pixels may be formed, and a peak region in the first-channel histogram may be detected. Subsequently a histogram of image values of a second channel may be formed accumulating second-channel values for only those image pixels with first-channel values within the peak region of the first-channel histogram, and a peak region in the second-channel histogram may be detected. An image characteristic may be associated with image pixels with first-channel and second-channel values within the first-channel peak and the second-channel peak regions, respectively.

29 Claims, 7 Drawing Sheets

METHODS AND SYSTEMS FOR CHARACTERIZING REGIONS OF SUBSTANTIALLY-UNIFORM COLOR IN A DIGITAL IMAGE

FIELD OF THE INVENTION

Embodiments of the present invention comprise methods and systems for characterizing background regions of substantially-uniform color in a digital image.

BACKGROUND

Many digital image processing enhancements that improve the visual quality of a digital image, often an image of a scanned document, may rely on the accurate identification of different image regions within the digital image. Additionally, accurate detection of various regions in an image may be critical in many compression processes. Image characteristics may be used in the identification of image regions.

Scanned document images may contain a page background region of a dominant background color, for example the color of the paper stock on which the document was printed, and several local background regions, each with substantially-uniform color. Detecting and enhancing the colors of these regions may improve the appearance of the digital document image by reducing the amount of visible noise and color variation. For example, replacing the substantially-uniform color values of pixels in a background region with a single color value may improve visual quality. Such processing also may lead to significant gains in compression efficiency in document compression applications.

Background detection may become significantly more difficult as page complexity increases. A document may contain multiple regions that may be labeled as page background; for example, the scanner platen may be visible in a scanned document or the document may contain large local background areas. Color gradations, halftone backgrounds, large halftone and large continuous-tone areas with uniformly colored regions, and color text are some of the image components that may complicate detection of local background regions. Scanner artifacts and noise may make it difficult to accurately label all background pixels in a document image.

SUMMARY

Some embodiments of the present invention may comprise methods and systems for characterizing regions of substantially-uniform color in a digital image. In some embodiments of the present invention, a histogram may be formed for the values of an image channel considering pixels in the image with channel values for an additional channel within an identified peak in the histogram for the additional-channel values. The peak values may be used to associate a color with the image region identified by the histogram peaks.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Scanned document images may contain a page background region of a dominant background color, for example the color of the paper stock on which the document was printed, and several local background regions, each with substantially-uniform color. Detecting and enhancing the colors of these regions may improve the appearance of the digital document image by reducing the amount of visible noise and color variation. For example, replacing the substantially-uniform color values of pixels in a background region with a single color value may improve visual quality and compression efficiency.

Some embodiments of the present invention comprise methods and systems for identifying and modifying regions of substantially-uniform color in a document image. In some embodiments of the present invention, the individual channels, also considered components, of a multi-channel, also considered multi-component, image may be examined or analyzed. An image may comprise a plurality of pixels wherein each pixel comprises multiple channel, or component, values, one value for each channel, or component. Exemplary multi-channel representations may comprise the following three-channel representations: an RGB color space, an sRGB color space, an HSV color space, an XYZ color space, a UVW color space and an LCC (Luma-Chroma-Chroma) color space, for example, Yuv, L*a*b*, Lab, La*b*, YCbCr and YIQ, and other three-channel representations known in the art. An exemplary four-channel representation may comprise a CMYK color space. Exemplary embodiments of the present invention may be described in relation to a three-channel LCC image representation. It will be readily understood that these descriptions are by way of illustration and not limitation.

Figure 1:
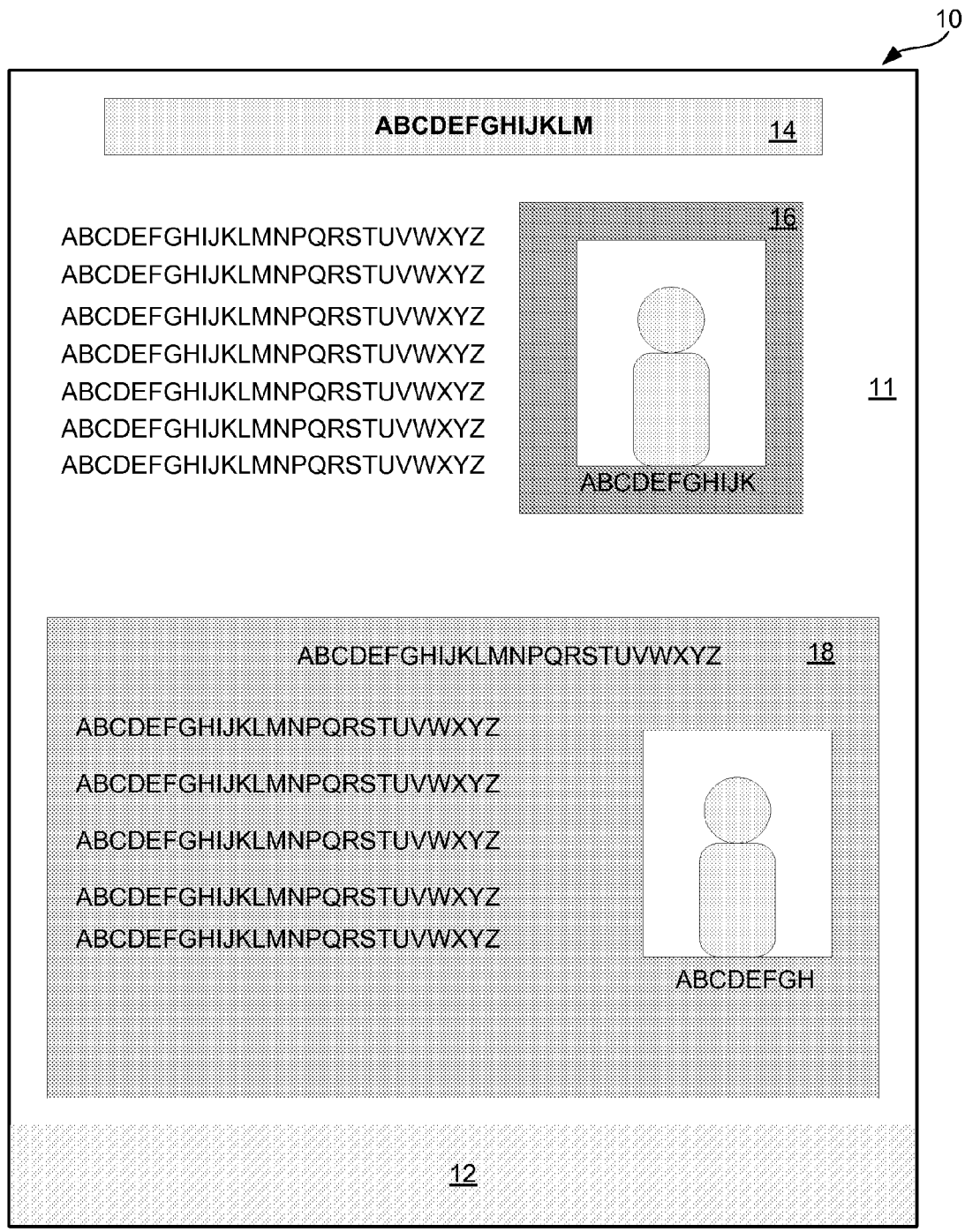
FIG. 1 is a drawing showing an exemplary document image comprising a page background region and a plurality of local background regions.

Some embodiments of the present invention may be described in relation to FIG. 1 which shows an exemplary image 10. The image 10 may be a document image comprising several regions including: a page background region 11 of a first substantially-uniform color, which may be the color of the paper stock on which the document is printed; a background region corresponding to the scanner platen 12, which may appear as a second substantially-uniform color in the scanned image; a first local background region 14 of a third substantially-uniform color; a second local background region 16 of a fourth substantially-uniform color; and a third local background region 18 of a fifth substantially-uniform color. Due to imperfections in the printing and scanning processes, all of the pixels comprising an image region of substantially-uniform color, for example a local background region, may not have the same color value. The color values of the pixels may form a small distribution around a central or peak color value. Embodiments of the present invention may assign, to pixels with color values in the small distribution, membership in a color class representing the substantially-uniform color in the image region. In a local background region, the color class may be referred to as a local background color estimate. In the page background region, the color class may be referred to as the page background color estimate.

Figure 2:
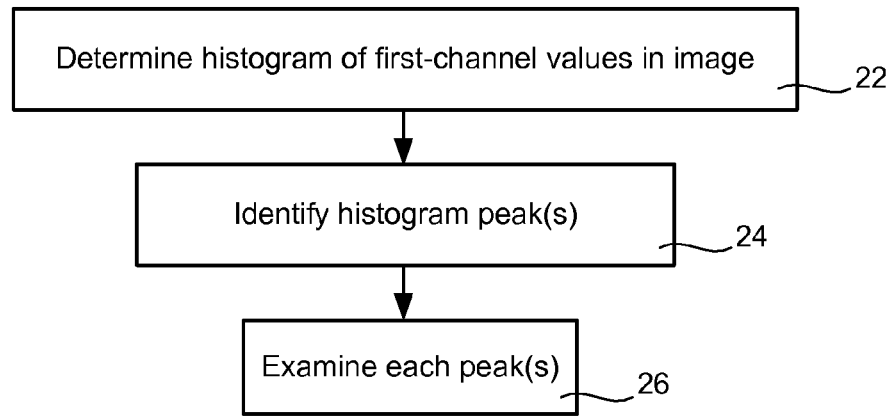
FIG. 2 is a diagram showing embodiments of the present invention comprising forming a first-channel histogram.

Some embodiments of the present invention may be described in relation to FIG. 2. The frequency-of-occurrence of the first-channel values in an image, also considered a histogram of the first-channel values, may be determined 22. The term histogram may be used for the purposes of this specification, drawings, and claims to refer to the frequency-of-occurrence of channel values in a data set. The term histogram may refer to a mapping that counts the number of observations that fall into various disjoint categories, also referred to as bins. For example, a histogram of first-channel values in an image may comprise a bin for each first-channel value and a bin count for each bin, wherein the bin count is the number of image pixels in the image with a first-channel value equal to that first-channel value associated with the bin. A bin may represent one value or a plurality of values. A histogram may be represented by any of numerous and well-understood-in-the-art software, hardware, and firmware constructs.

Peaks in the first-channel histogram may be identified 24 and examined 26. In some embodiments, a peak may be identified 24 and then examined 26, with the identification 24 and examination 26 process continuing until no additional peaks may be identified. In alternative embodiments, the histogram may be analyzed and all peaks may be identified 24, and then each peak may be examined 26, in turn, until all of the identified peaks are examined. Many peak detection methods exist in the art and may be used to identify the peaks in the histogram. One exemplary method is described in U.S. Pat. No. 4,731,863.

In some embodiments of the present invention, the first-channel may be a luminance channel in an LCC color space. In alternative embodiments, the first-channel may be a green channel in an RGB color space.

In some embodiments of the present invention, the histogram data may be pre-processed prior to performing peak detection. Some pre-processing may improve the detection accuracy of the peak detection. An exemplary pre-processing step may comprise one-dimensional smoothing to remove local variations in the frequency-of-occurrence data. Another exemplary pre-processing step may comprise thresholding in which any frequency-of-occurrence value below a threshold may be set to zero.

Figure 3:
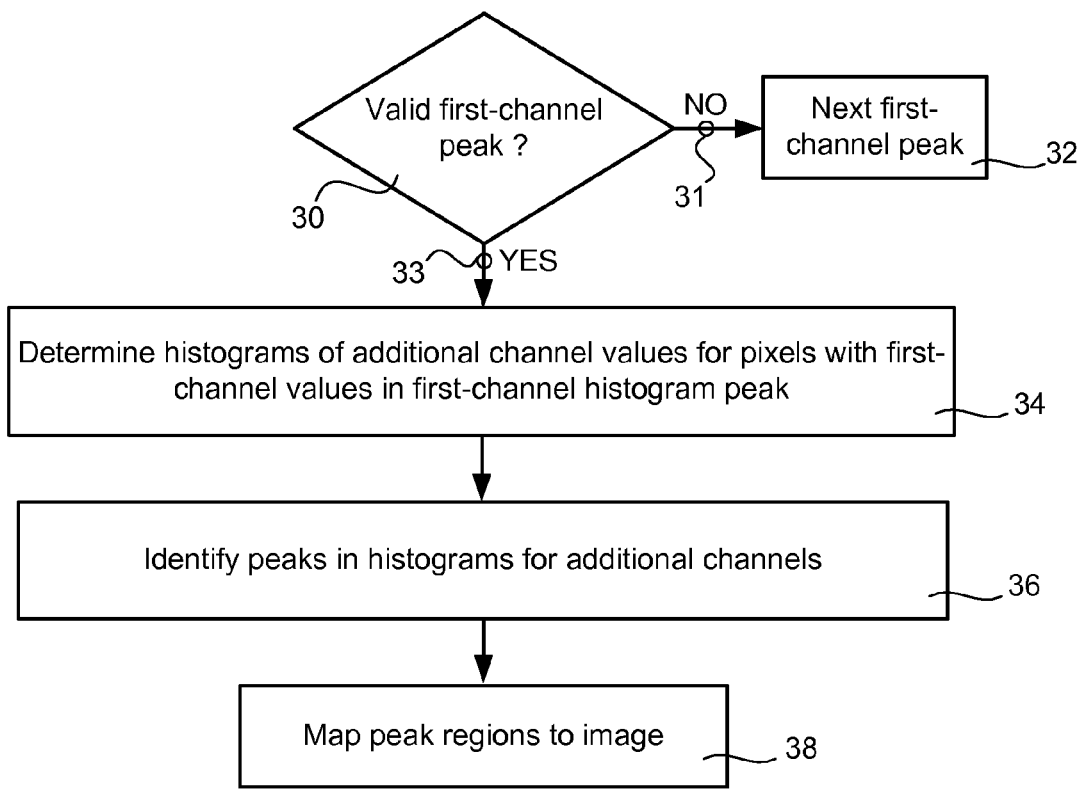
FIG. 3 is a diagram showing embodiments of the present invention comprising forming a histogram for an additional-channel using only the pixels belonging to a first-channel histogram peak.
Figure 4:
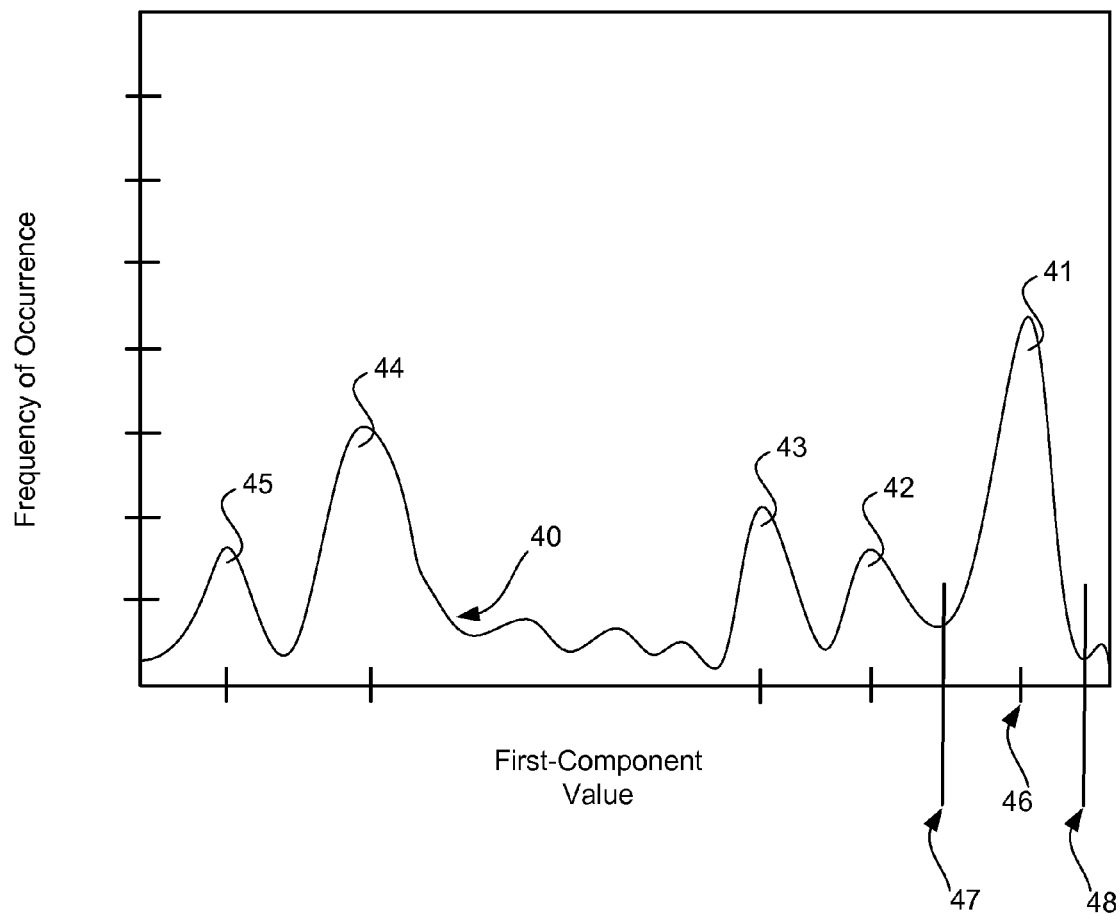
FIG. 4 depicts an exemplary first-channel histogram comprising multiple peaks.

Some embodiments of the present invention may be described in relation to FIG. 3. An identified peak may be analyzed to determine if it is a valid peak 30. FIG. 4 depicts an exemplary graphical representation 40 of the histogram of first-component values. The histogram data 40 shown in FIG. 4 may comprise five peaks 41-45. Peak detection may comprise locating the first-component value associated with the peak frequency-of-occurrence. In FIG. 4, for example, the first-component value 46 may identify peak 41, considered peak1, and may be denoted $C1^{peak1}$. Peak detection may comprise locating a minimum and a maximum first-component value associated with a peak, and image pixels with a first-component value between the minimum and the maximum first-component value associated with the peak may be considered to belong to the peak. In FIG. 4, for example, the first-component value 47 may identify the start of peak1 41 and may be denoted $C1_{min}^{peak1}$, and the first-component value 48 may identify the end of peak1 41 and may be denoted $C1_{max}^{peak1}$. Pixels in the image with first-component values between $C1_{min}^{peak1}$ and $C1_{max}^{peak1}$ may be considered to belong to peak1. The number of image pixels in the peak may be determined by summing the frequency-of-occurrence of the first-component values within the peak, that is, summing the bin counts for all of the bins within the peak.

In some embodiments, a peak may be considered a valid peak if it comprises a sufficient number of image pixels. This may be determined in some embodiments by comparison of the number of pixels in the peak with a fixed threshold. In alternative embodiments, the threshold may be dynamic. In alternative embodiments, a peak may be considered a valid peak if the peak width is sufficiently narrow. The peak width may be determined according to $C1_{max}^{peak1} - C1_{min}^{peak1}$ in some embodiments. In some embodiments, the peak width may be compared to a fixed threshold to determine if the peak is a valid peak. In alternative embodiments, the threshold may be dynamic. In still alternative embodiments, a peak may be considered a valid peak based on a combination of the two above-mentioned criteria. In some embodiments, the combination may be a weighted combination.

In some embodiments, if a first-channel peak is determined 30 to be an invalid peak 32, then the next first-channel histogram peak may be examined 32. If a first-channel histogram peak is a valid peak 33, then a histogram of the values of each additional channel may be determined 34 for those image pixels belonging to the valid first-channel histogram peak. For example, in an YCbCr space, after locating a peak in the luminance (Y) histogram, then the chrominance channels (CbCr) may be examined for those pixels with luminance values belonging to the luminance peak, and a histogram of Cb values and a histogram of Cr values for the pixels may be determined 34. By way of an additional example, in an RGB space, after locating a green component (G) peak, then the red component and blue component may be examined for those pixels with green values belonging to the green peak, and a histogram of red values and a histogram of blue values for the pixels may be determined 34.

Figure 5:
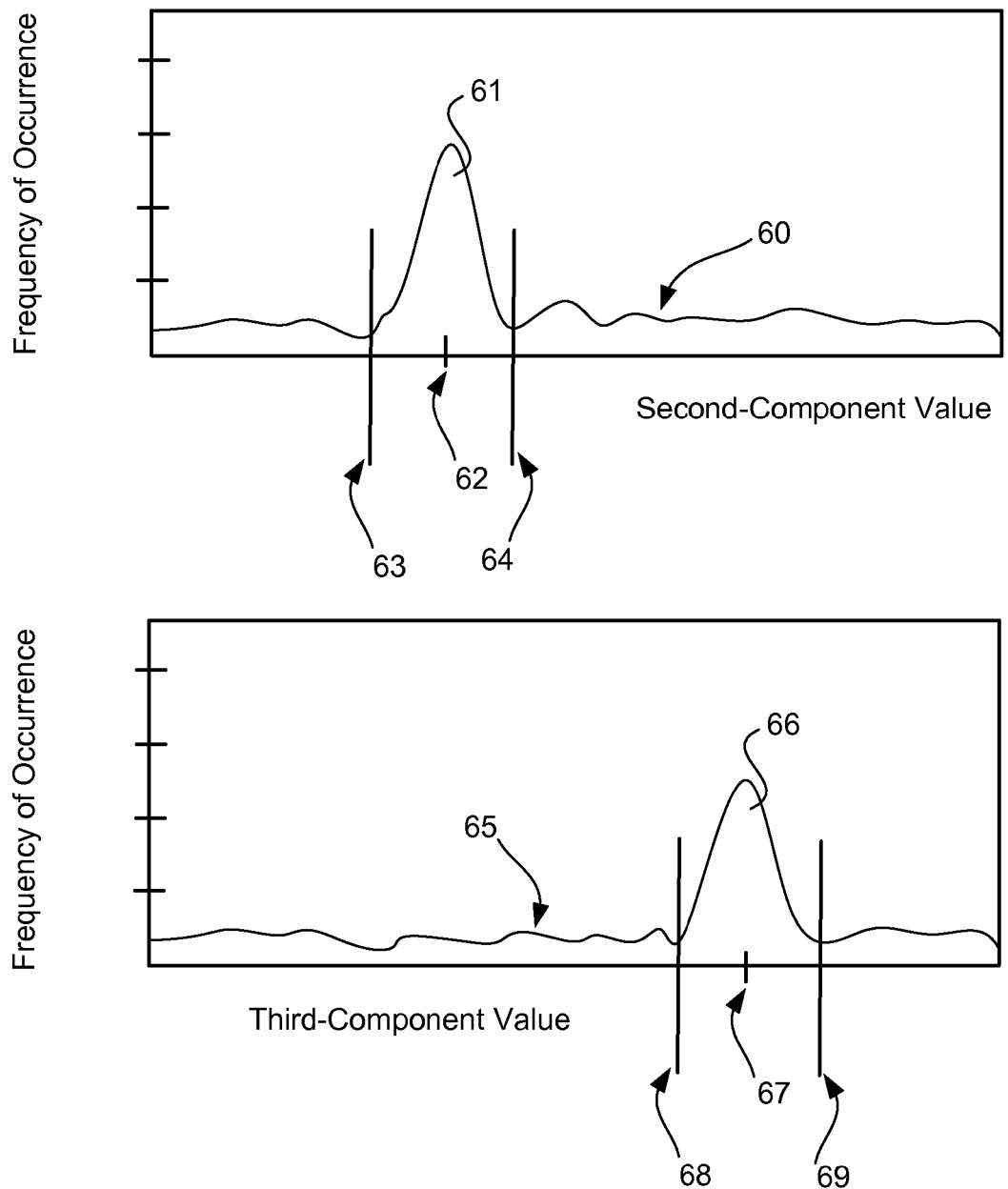
FIG. 5 depicts exemplary second- and third-channel histograms.

In some embodiments of the present invention, which may be described in relation to FIG. 5, a histogram of the values of each additional channel may be determined for the pixels belonging to the first-channel histogram peak. FIG. 5 depicts an exemplary graphical representation 60 of the histogram of second-component values in the pixels within the first-component peak, peak1, and an exemplary graphical representation 65 of the histogram of third-component values in the pixels within the first-component peak, peak1. After the determining the histograms for the additional channels for the pixels within the first-channel peak, the peaks in each additional channel histogram may be identified 36. In some embodiments, the same peak detection method used in determining the peaks in the first-channel histogram may be used. In alternative embodiments, another peak detection method may be used. In the example shown in FIG. 5, a second-component histogram peak 61 may be identified with peak values, $C2^{peak1,1}$ 62, $C2_{min}^{peak1,1}$ 63 and $C2_{max}^{peak1,1}$ 64 and a third-component histogram peak 66 may be identified with peak values, $C3^{peak1,1}$ 67, $C3_{min}^{peak1,1}$ 68 and $C3_{max}^{peak1,1}$ 69. A region in the image comprising pixels with first-component values in the range $C1_{min}^{peak1}$ to $C1_{max}^{peak1}$, and second-component values in the range $C2_{min}^{peak1,1}$ to $C2_{max}^{peak1,1}$, and third-component values in the range $C3_{min}^{peak1,1}$ to $C3_{min}^{peak1,1}$ may be associated 38 with a common label, for example, background1. In some embodiments of the present invention, if either or both additional component channels comprise multiple valid peaks, one peak may be selected from each component as the valid peak. The selected peak may be that peak comprising the most number of pixels, that peak comprising the narrowest range, that peak comprising the largest frequency-of-occurrence value, or any other selected peak. In alternative embodiments, all valid-peak combinations may be mapped to image regions. For example, for a single first-channel peak, and three, identified, valid second-channel peaks, and two identified, valid third-channel peaks, six image regions and associated labels may be determined.

Figure 6:
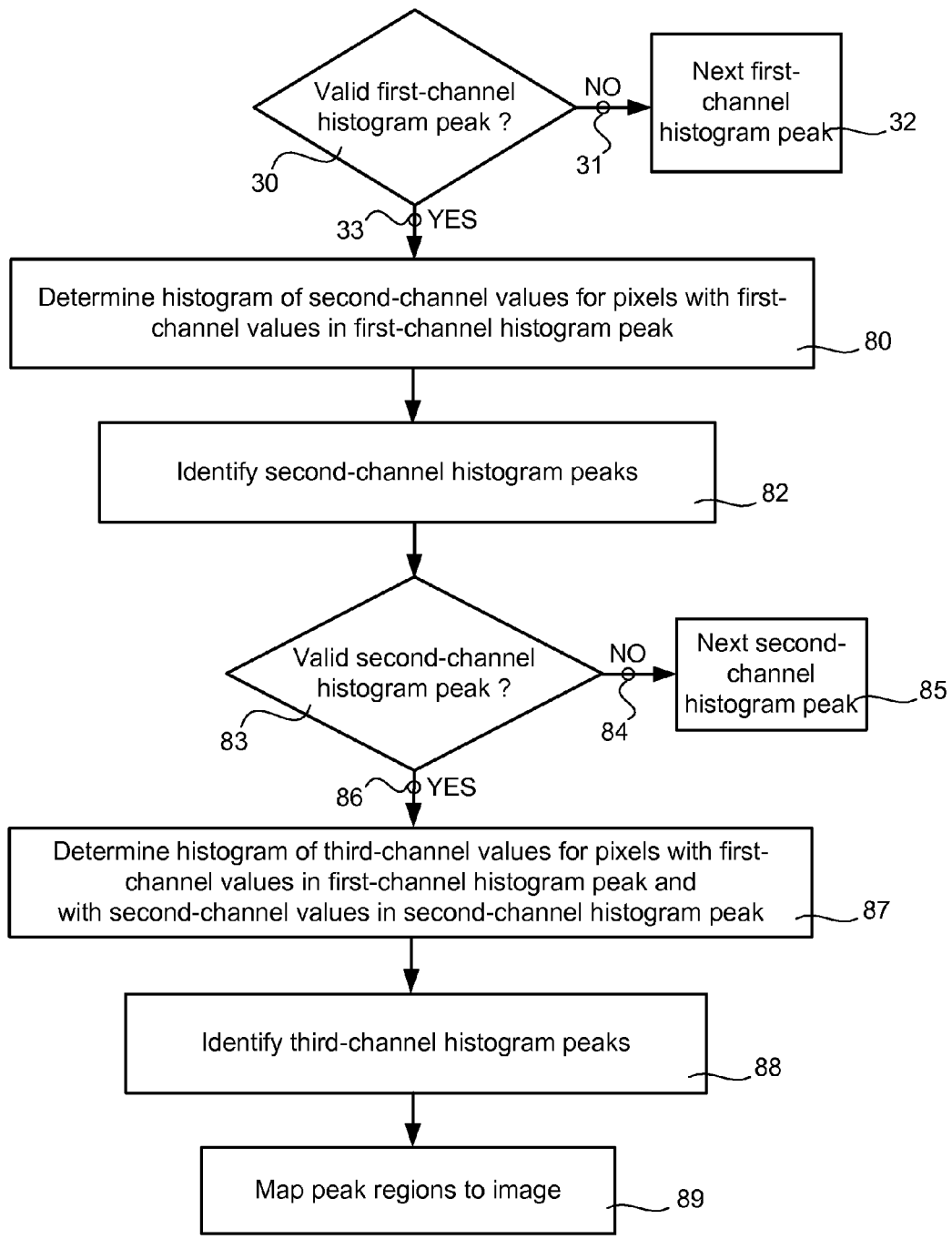
FIG. 6 is a diagram showing embodiments of the present invention comprising mapping histogram peak regions to image regions.

Some embodiments of the present invention may be described in relation to FIG. 6. In these embodiments, if a first-channel histogram peak is determined 30 to be an invalid peak 32, then the next first-channel histogram peak may be examined 32. If a first-channel histogram peak is a valid peak 33, then the histogram of the second-channel values may be determined 80 for those image pixels belonging to the valid first-channel histogram peak. For example, in an YCbCr space, after locating a peak in the luminance (Y) histogram, then one of chrominance channels (CbCr), for example Cb, may be examined for those pixels with luminance values belonging to the luminance peak, and the histogram of Cb values for the pixels may be determined 80. By way of an additional example, in an RGB space, after locating a peak in the green component (G) histogram, then one of either the red component or the blue component, for example red, may be examined for those pixels with green values belonging to the green peak, and the histogram of red values for the pixels may be determined 80.

Peaks in the second-channel histogram may be determined 82 and examined for validity 83. If a second-channel histogram peak is not valid 84, then the next second-channel histogram peak may be examined 85. If a second-channel histogram peak is a valid peak 86, then the histogram of third-channel values may be determined 87 for those image pixels belonging to the first-channel histogram peak and the second-channel histogram peak. In these embodiments, only pixels in the first-channel histogram peak and the second-channel histogram peak are considered in determination 87 of the histogram for the third channel. The peaks may then be identified and validated in the third-channel histogram 88. Similar to the embodiments described above in relation to FIG. 3, if multiple peaks are detected in the third-channel histogram, in some embodiments, one of the detected peaks may be selected for image data mapping or labeling 89. In alternative embodiments, multiple regions may be defined and labeled according to all peak combinations 89.

Some embodiments of the present invention comprise the embodiments depicted in FIG. 6 extended beyond three-channels with subsequent elimination of contributing image pixels after each channel peak selection.

In the embodiment described above, multiple passes through the image data may be required. One pass through the image data may be required to determine the first-channel histogram, and additional passes may be required to determine the additional-channel histograms. In alternative embodiments, the first-channel and additional-channel histograms may be constructed in a single pass if restrictions are placed on the types of expected background regions. Using a single pass over the image data may have a computational benefit. If background regions in an image may be expected to have characteristic first-channel values, then as the image is traversed, the first-channel histogram may be formed using all pixels, while only those pixels having characteristic first-channel values may be accumulated into the histograms of the additional channels. The histograms for the additional channels may be an approximation to the histograms obtained by strict restriction during a subsequent pass to only those pixels in the first-channel histogram peak.

Multiple background regions may be determined by examination of the first-channel histogram peaks according to any of the embodiments described above. In some embodiments of the present invention, an estimate of the page background region may be determined from the plurality of regions identified. In some embodiments of the present invention, the page background region may be selected as the region comprising the most number of pixels. In alternative embodiments, the page background may be the region comprising the pixels belonging to the highest-luminance peak.

Figure 7:
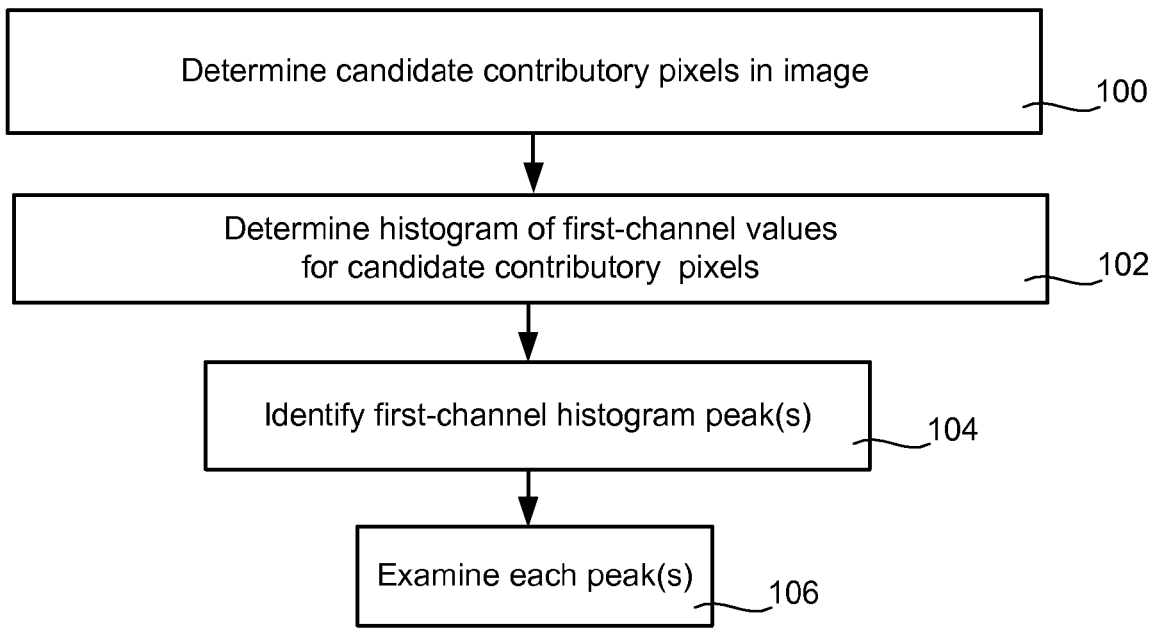
FIG. 7 is a diagram showing embodiments of the present invention comprising forming a histogram using candidate contributory image pixels.

In some embodiments of the present invention, all image pixels may be considered in determining the first-channel histogram. In alternative embodiments shown in FIG. 7, candidate background regions may be identified 100, and only pixels in the candidate background regions may be accumulated in the first-channel histogram 102. A histogram of the first-channel values, may be determined 102. Peaks in the first-channel histogram may be identified 104 and examined 106. In some embodiments, a peak may be identified 104 and then examined 106, with the identification 104 and examination 106 process continuing until no additional peaks may be identified. In alternative embodiments, the histogram may be analyzed and all peaks may be identified 104, and then each peak may be examined 106, in turn, until all of the identified peaks are examined. Examination of each peak 106 may be according to any of the embodiments described herein.

Figure 8:
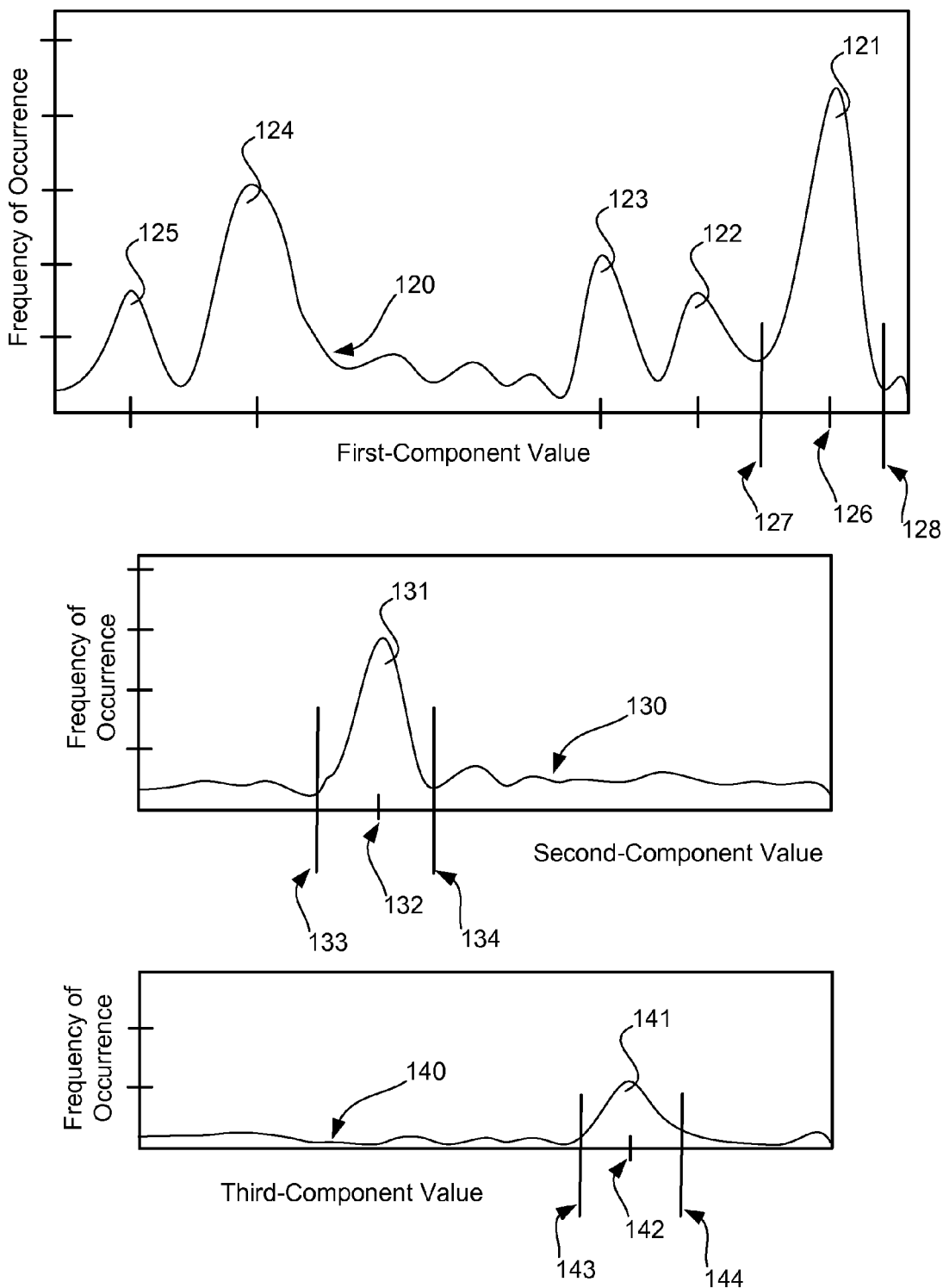
FIG. 8 depicts three exemplary histograms.

In some embodiments of the present invention, pixels in an image may be associated with a background region according to the embodiments described above. Some embodiments of the present invention may further comprise associating a color with a background region. Some embodiments may be illustrated in relation to FIG. 8. FIG. 8 depicts three exemplary histograms 120, 130, 140 for a three-channel image. The first-channel histogram 120 may comprise five peaks 121-125. The peak 121 may be identified by three values: the first-channel value 127 at which the peak 121 may be considered to start, which may be denoted $C1_{min}^{peak1}$, the first-channel value 128 at which the peak 121 may be considered to end, which may be denoted $C1_{max}^{peak1}$, and the first-channel value 126 at which the largest bin count may occur, which may be denoted $C1^{peak1}$. An exemplary second-channel histogram 130 corresponding to the frequency-of-occurrence of second-channel values for the pixels in the first-channel peak 121 may be depicted by the histogram 130. A second-channel peak 131 may be identified by three values: the second-channel value 133 at which the peak 131 may be considered to start, which may be denoted $C2_{min}^{peak1,1}$, the second-channel value 134 at which the peak 131 may be considered to end, which may be denoted $C2_{max}^{peak1,1}$, and the second-channel value 132 at which the largest bin count may occur, which may be denoted $C2^{peak1,1}$. An exemplary third-channel histogram 140 corresponding to the frequency-of-occurrence of third-channel values as determined in any of the previously described embodiments of the present invention is depicted. A third-channel peak 141 may be identified by three values: the third-channel value 143 at which the peak 141 may be considered to start, which may be denoted $C3_{min}^{peak1,1}$, the third-channel value 144 at which the peak 141 may be considered to end, which may be denoted $C3_{max}^{peak1,1}$, and the third-channel value 142 at which the largest bin count may occur, which may be denoted $C3^{peak1,1}$. In some embodiments of the present invention, pixels in the image with first-channel values belonging to peak 121, with second-channel values belonging to peak 131 and with third-channel values belonging to peak 141 may be identified as an image region, for example, a background region. The region may be identified or denoted as:

$$B = I(x | C1_{min}^{peak1} \leq x^{C1} \leq C1_{max}^{peak1}; \\ C2_{min}^{peak1,1} \leq x^{C2} \leq C2_{max}^{peak1,1}; \\ C3_{min}^{peak1,1} \leq x^{C3} \leq C3_{max}^{peak1,1}),$$

where B denotes the background region, I denotes the image, x denotes a pixel with component values $x^{C1}$, $x^{C2}$ and $x^{C3}$.

In some embodiments of the present invention, a region, or characteristic of the image (e.g., substantially uniform page background color, substantially uniform local background region color), may be identified, or characterized, by a range of channel values, for each channel in the image representation, within which the channel values for pixels in the region must lie. In some of these embodiments, a plurality of regions may be identified, or characterized, in a look-up-table with an entry for each region, wherein each entry describes the channel values associated with the region. In alternative embodiments, a region may be identified, or characterized, by an image map, wherein at each pixel location, a code value or label may be assigned to the pixel, and the code value may associate pixels belonging to the same image region.

In some embodiments of the present invention, a color may be associated with the region. In some embodiments of the present invention, the color associated with a region, B, may be given according to the component values with largest bin count in each of the component peaks. For the exemplary three-channel embodiments described above this may be:

$$(C1^{peak1}, C2^{peak1,1}, C3^{peak1,1}).$$

For a K-channel image, the color associated with a region may be given by $(C1^{peak1}, C2^{peak1,1}, \ldots, CK^{peak1,1})$, wherein the K peaks, one peak for each of the K channels, may be determined according to any embodiments of the present invention described herein.

In alternative embodiments of the present invention, a color may be associated with the region, B, according to a weighted average of the component values within the peaks defining the region. For the exemplary three-channel embodiments described above this may be according to:

$$B^{C1} = \frac{\sum_{j=C1_{min}^{peak1}}^{C1_{max}^{peak1}} j \cdot H^{C1}(j)}{\sum_{j=C1_{min}^{peak1}}^{C1_{max}^{peak1}} H^{C1}(j)},$$

-continued $$B^{C2} = \frac{\sum_{j=C2_{min}^{peak1,1}}^{C2_{max}^{peak1,1}} j \cdot H^{C2}(j)}{\sum_{j=C2_{min}^{peak1,1}}^{C2_{max}^{peak1,1}} H^{C2}(j)},$$

$$B^{C3} = \frac{\sum_{j=C3_{min}^{peak1,1}}^{C3_{max}^{peak1,1}} j \cdot H^{C3}(j)}{\sum_{j=C3_{min}^{peak1,1}}^{C3_{max}^{peak1,1}} H^{C3}(j)},$$

where $B^{Ci}$ is the $i^{th}$-channel value, $H^i$ is the $i^{th}$-channel histogram and $H^i(j)$ is the bin count of the $j^{th}$ bin in the $i^{th}$-channel histogram.

For a K-channel image, the color associated with a region may be assigned according to:

$$B^{C1} = \frac{\sum_{j=C1_{min}^{peak1}}^{C1_{max}^{peak1}} j \cdot H^{C1}(j)}{\sum_{j=C1_{min}^{peak1}}^{C1_{max}^{peak1}} H^{C1}(j)},$$

$$B^{C2} = \frac{\sum_{j=C2_{min}^{peak1,1}}^{C2_{max}^{peak1,1}} j \cdot H^{C2}(j)}{\sum_{j=C2_{min}^{peak1,1}}^{C2_{max}^{peak1,1}} H^{C2}(j)}, \ldots ,$$

$$B^{CK} = \frac{\sum_{j=CK_{min}^{peak1}}^{CK_{max}^{peak1}} j \cdot H^{CK}(j)}{\sum_{j=CK_{min}^{peak1}}^{CK_{max}^{peak1}} H^{CK}(j)},$$

wherein the K peaks, one peak for each of the K channels, may be determined according to any embodiments of the present invention described herein.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A non-transitory computer readable medium encoded with a computer program code for implementing a method for determining an image characteristic in a digital image, said method comprising:
   a) determining a first plurality of pixels in a digital image;
   b) determining a first histogram of values of a first-channel for said first plurality of pixels;
   c) identifying, from only data in said first histogram, a first peak in said first histogram, wherein said first peak is identified by a first-channel starting value and a first-channel ending value;

d) determining a second histogram of values of a second-channel for a second plurality of pixels in said digital image, wherein said second plurality of pixels is limited to pixels, from said first plurality of pixels, with a first-channel value between said first-channel starting value and said first-channel ending value;

e) identifying, from only data in said second histogram, a second peak in said second histogram; and f) identifying a characteristic of said image with said first peak and said second peak.

2. A computer readable medium according to claim 1, the method further comprising associating a first color with said characteristic.

3. A computer readable medium according to claim 2, wherein:

a) said first color first-channel value is equal to the first-channel value whereat said first peak has a maximum bin count; and b) said first color second-channel value is equal to the second-channel value whereat said second peak has a maximum bin count.

4. A computer readable medium according to claim 2, wherein:

a) said first color first-channel value is equal to the weighted average of the first-channel values between said first-channel starting value and said first-channel ending value;

b) said second peak is identified by a second-channel starting value and a second-channel ending value; and c) said first color second-channel value is equal to the weighted average of the second-channel values between said second-channel starting value and said second-channel ending value.

5. A computer readable medium according to claim 1, wherein said second peak is identified by a second-channel starting value and a second-channel ending value; and further comprising classifying a third plurality of pixels in said image as a first region, wherein said third plurality of pixels is limited to pixels, from said second plurality of pixels, with a second-channel value between said second-channel starting value and said second-channel ending value.

6. A computer readable medium according to claim 5, wherein said classifying comprises mapping said first peak and said second peak to said third plurality of pixels.

7. A computer readable medium according to claim 6, wherein said mapping comprises generating an entry into a look-up-table, said entry comprising a description of the channel values associated with said first region.

8. A computer readable medium according to claim 5, the method further comprising associating a first color with said first region.

9. A computer readable medium according to claim 8, wherein:

a) said first color first-channel value is equal to the first-channel value whereat said first peak has a maximum bin count; and b) said first color second-channel value is equal to the second-channel value whereat said second peak has a maximum bin count.

10. A computer readable medium according to claim 8, wherein:

a) said first color first-channel value is equal to the weighted average of the first-channel values between said first-channel starting value and said first-channel ending value; and b) said first color second-channel value is equal to the weighted average of the second-channel values between said second-channel starting value and said second-channel ending value.

11. A computer readable medium according to claim 1, the method further comprising:

a) determining a third histogram of values of a third-channel for a fourth plurality of pixels in said digital image;

b) identifying, from only data in said third histogram, a third peak in said third histogram, wherein said third peak is identified by a third-channel starting value and a third-channel ending value; and c) wherein said first plurality of pixels is limited to pixels in said digital image with a third-channel value between said third-channel starting value and said third-channel ending value.

12. A computer readable medium according to claim 11, the method further comprising:

a) classifying a third plurality of pixels in said image as a first region, wherein said third plurality of pixels is limited to pixels from said second plurality of pixels with a second-channel value between said second-channel starting value and said second-channel ending value.

13. A computer readable medium according to claim 12, the method further comprising associating a first color with said first region.

14. A computer readable medium according to claim 13, wherein:

a) said first color first-channel value is equal to the first-channel value whereat said first peak has a maximum bin count;

b) said first color second-channel value is equal to the second-channel value whereat said second peak has a maximum bin count; and c) said first color third-channel value is equal to the third-channel value whereat said third peak has a maximum bin count.

15. A computer readable medium according to claim 13, wherein:

a) said first color first-channel value is equal to the weighted average of the first-channel values between said first-channel starting value and said first-channel ending value;

b) said first color second-channel value is equal to the weighted average of the second-channel values between said second-channel starting value and said second-channel ending value; and c) said first color third-channel value is equal to the weighted average of the third-channel values between said third-channel starting value and said third-channel ending value.

16. A computer readable medium according to claim 11, wherein said third-channel is a luminance channel.

17. A computer readable medium according to claim 11, wherein said fourth plurality of pixels comprises said digital image.

18. A computer readable medium according to claim 11, wherein said fourth plurality of pixels comprises a plurality of candidate background-region pixels.

19. A computer readable medium according to claim 1, the method further comprising:

a) determining a third histogram of values of a third channel for said second plurality of pixels;

b) identifying, from only data in said third histogram, a third peak in said third histogram, wherein said third peak is identified by a third-channel starting value and a third-channel ending value; and c) wherein said identifying a characteristic of said image further comprises said third peak.

20. A computer readable medium according to claim 19, the method further comprising:
a) classifying a third plurality of pixels as a first region, wherein said third plurality of pixels is limited to pixels in said second plurality of pixels with a second-channel value values between said second-channel starting value and said second-channel ending value and a third-channel value between said third-channel starting value and said third-channel ending value.

21. A computer readable medium according to claim 20, the method further comprising associating a first color with said first region.

22. A computer readable medium according to claim 21, wherein
a) said first color first-channel value is equal to the first-channel value whereat said first peak has a maximum bin count;
b) said first color second-channel value is equal to the second-channel value whereat said second peak has a maximum bin count; and
c) said first color third-channel value is equal to the third-channel value whereat said third peak has a maximum bin count.

23. A computer readable medium according to claim 21, wherein:
a) said first color first-channel value is equal to the weighted average of the first-channel values between said first-channel starting value and said first-channel ending value;
b) said first color second-channel value is equal to the weighted average of the second-channel values between said second-channel starting value and said second-channel ending value; and
c) said first color third-channel value is equal to the weighted average of the third-channel values between said third-channel starting value and said third-channel ending value.

24. A computer readable medium according to claim 19, wherein said first channel is a luminance channel.

25. A computer readable medium according to claim 19, wherein said first plurality of pixels comprises said digital image.

26. A computer readable medium according to claim 19, wherein said first plurality of pixels comprises a plurality of candidate background-region pixels.

27. An image-processing apparatus for determining an image characteristic in a digital image, said image-processing apparatus comprising:
a) in a computing system comprising at least one computing device, a first selector for determining a first plurality of pixels in a digital image;
b) in said computing system, a first histogram generator for determining a first histogram of values of a first-channel for said first plurality of pixels;
c) in said computing system, a first peak identifier for identifying, from only data in said first histogram, a first peak in said first histogram, wherein said first peak identifier identifies a first-channel starting value and a first-channel ending value;
d) in said computing system, a second histogram generator for determining a second histogram of values of a second-channel for a second plurality of pixels in said digital image, wherein said second plurality of pixels is limited to pixels, from said first plurality of pixels, with a first-channel value between said first-channel starting value and said first-channel ending value;
e) in said computing system, a second peak identifier for identifying, from only data in said second histogram, a second peak in said second histogram; and
f) in said computing system, a characteristic generator for identifying a characteristic of said image with said first peak and said second peak.

28. A non-transitory computer readable medium encoded with a computer program code for implementing a method for determining a page background color in a digital image, said method comprising:
a) determining a first plurality of pixels in a digital image;
b) determining a first histogram of values of a first-channel for said first plurality of pixels;
c) identifying, from only data in said first histogram, a first peak in said first histogram, wherein said first peak is identified by a first-channel starting value and a first-channel ending value;
d) determining a second histogram of values of a second-channel for a second plurality of pixels, wherein said second plurality of pixels is limited to pixels in said first plurality of pixels with a first-channel value between said first-channel starting value and said first-channel ending value;
e) determining a third histogram of values of a third-channel for said second plurality of pixels;
f) identifying, from only data in said second histogram, a second peak in said second histogram, wherein said second peak is identified by a second-channel starting value and a second-channel ending value;
g) identifying, from only data in said third histogram, a third peak in said third histogram, wherein said third peak is identified by a third-channel starting value and a third-channel ending value; and
h) determining a page background color, wherein said page background color is based on said first peak, said second peak and said third peak.

29. A computer readable medium according to claim 28, the method further comprising:
a) classifying a third plurality of pixels in said digital image as a page background region, wherein said third plurality of pixels is limited to pixels from said second plurality of pixels with a second-channel value between said second-channel starting value and a second-channel ending value; and a third-channel value between said third-channel starting value and said third-channel ending value; and
b) associating said page background color with said page background region.

* * * * *

UNITED STATES PATENT AND TRADEMARK OFFICE
CERTIFICATE OF CORRECTION

PATENT NO. : 8,134,762 B2
APPLICATION NO. : 11/668241
DATED : March 13, 2012
INVENTOR(S) : Ahmet Mufit Ferman and Jon M. Speigle It is certified that error appears in the above-identified patent and that said Letters Patent is hereby corrected as shown below:

ABSTRACT, Line 7, should read:

Subsequently, a histogram of image values of a second chan-

Column 8, Lines 40-45, should read:

$$B^{CK} = \frac{\sum_{j=CK_{min}^{peak1,1}}^{CK_{max}^{peak1,1}} j \cdot H^{CK}(j)}{\sum_{j=CK_{min}^{peak1,1}}^{CK_{max}^{peak1,1}} H^{CK}(j)},$$

Signed and Sealed this
Twenty-ninth Day of May, 2012

David J. Kappos
*Director of the United States Patent and Trademark Office*